United States Patent
Kurabayashi

(10) Patent No.: US 10,828,568 B2
(45) Date of Patent: Nov. 10, 2020

(54) GAME SYSTEM, ETC. PERFORMING PATH FINDING OF NON-PLAYER CHARACTER ON THE BASIS OF MOVEMENT HISTORY OF PLAYER

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 219 days.

(21) Appl. No.: 15/969,610

(22) Filed: May 2, 2018

(65) Prior Publication Data

US 2018/0250595 A1   Sep. 6, 2018

Related U.S. Application Data

(63) Continuation of application No. PCT/JP2016/077965, filed on Sep. 23, 2016.

(30) Foreign Application Priority Data

Nov. 4, 2015  (JP) .................................. 2015-216912

(51) Int. Cl.
   *A63F 13/00*   (2014.01)
   *A63F 13/56*   (2014.01)
   (Continued)

(52) U.S. Cl.
   CPC .............. *A63F 13/56* (2014.09); *A63F 13/35* (2014.09); *A63F 13/55* (2014.09); *A63F 13/67* (2014.09); *A63F 13/79* (2014.09)

(58) Field of Classification Search
   CPC ....... G06T 19/003; G06T 19/05; G06T 19/00; G06T 19/40
   See application file for complete search history.

(56) References Cited

U.S. PATENT DOCUMENTS

| | | | | |
|---|---|---|---|---|
| 7,637,813 | B2 * | 12/2009 | Katayama | ............... A63F 13/10 463/31 |
| 8,393,963 | B2 * | 3/2013 | Okamura | ............... A63F 13/00 463/36 |

(Continued)

FOREIGN PATENT DOCUMENTS

JP   2000-237453 A   9/2000

OTHER PUBLICATIONS

International Search Report issued in corresponding International Application No. PCT/JP2016/077965, dated Nov. 8, 2016 (2 pages).

(Continued)

*Primary Examiner* — Omkar A Deodhar
*Assistant Examiner* — Eric M Thomas
(74) *Attorney, Agent, or Firm* — Osha Bergman Watanabe & Burton LLP

(57) ABSTRACT

A system according to the present invention includes a server and electronic devices and, in this system, characters operated by players are placed in a common game field and the game progresses. The system determines a movement start position and a movement target position for moving an NPC, determines, on the basis of history information of global movement paths represented by orders of positions of log blocks from the movement start position to the movement target position of a player character that is operated by players, a global movement path having the highest frequency at which the global movement path is selected by the players, determines a path from the determined movement start position or a sub-destination position to a sub-destination position in the next log block or to the determined movement target position on the determined global movement path, and moves the NPC according to the determined path.

11 Claims, 8 Drawing Sheets

(51) Int. Cl.
   *A63F 13/67*   (2014.01)
   *A63F 13/55*   (2014.01)
   *A63F 13/35*   (2014.01)
   *A63F 13/79*   (2014.01)

(56) References Cited

U.S. PATENT DOCUMENTS

2002/0175918 A1* 11/2002 Barber ................... A63F 13/10
                                                          345/474
2007/0276709 A1* 11/2007 Trimby ................... A63F 13/00
                                                          705/6

OTHER PUBLICATIONS

Written Opinion issued in corresponding International Application No. PCT/JP2016/077965, dated Nov. 8, 2016 (3 pages).

* cited by examiner

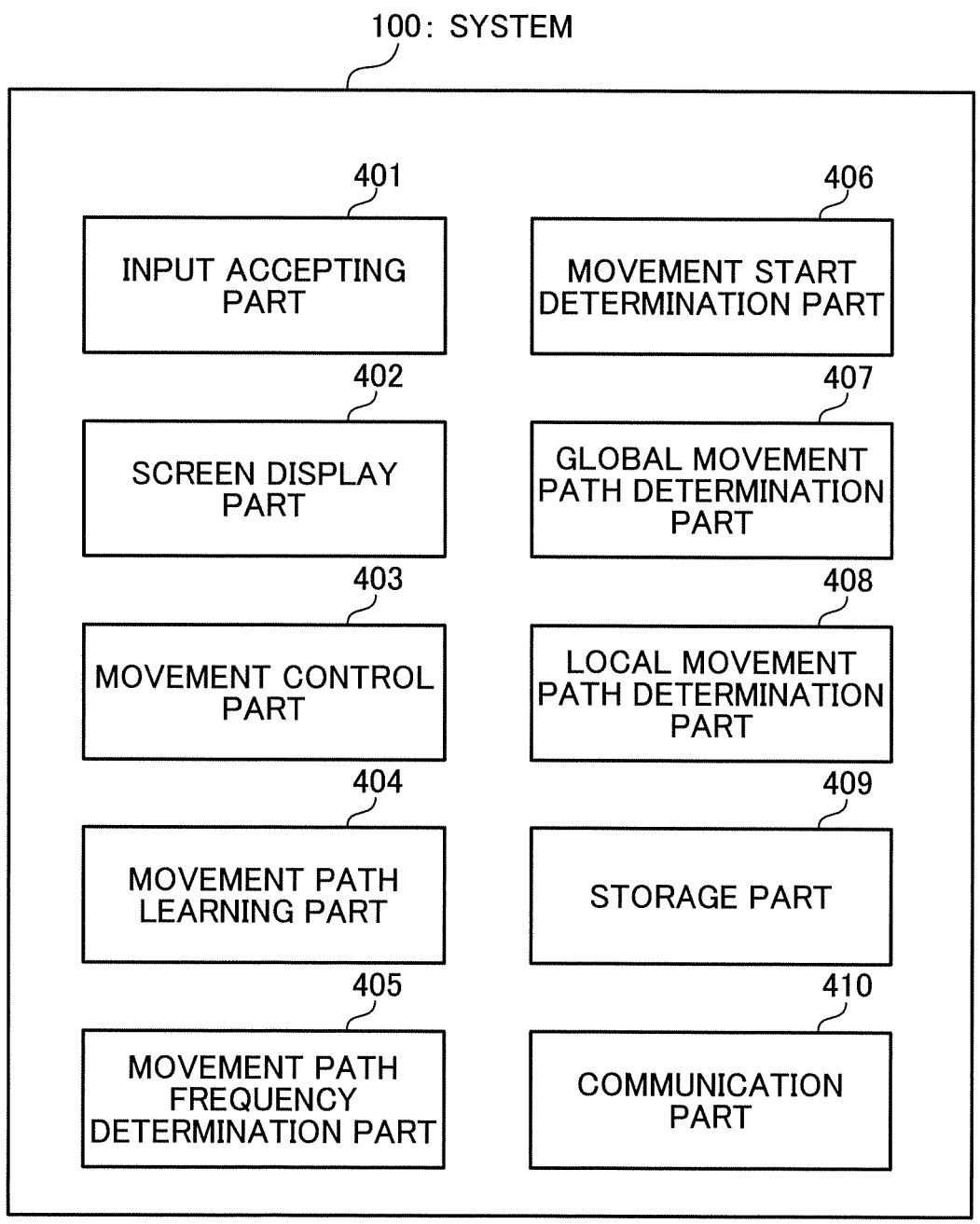

GAME SYSTEM, ETC. PERFORMING PATH FINDING OF NON-PLAYER CHARACTER ON THE BASIS OF MOVEMENT HISTORY OF PLAYER

TECHNICAL FIELD

The present invention relates to a game system, a program, a server, an electronic device, and a game control method for performing path finding of a non-player character on the basis of the movement history of players.

BACKGROUND ART

Recently, more and more players are enjoying network-enabled games in which a plurality of players can participate via a network. These games are realized by a game system in which electronic devices such as game machines, PC terminals, or mobile phones perform communication with a server apparatus, etc. of a game administrator, and players who operate the electronic devices can proceed with a game while cooperating with other players or can play against each other in a competition game.

Characters appearing in a game include, in addition to player characters that can be operated by the players, non-player characters (hereinafter referred to as "NPCs") that are not operated by the players, and computers can control the NPCs so as to cause them to take actions independently.

For example, in the case of a car racing game, Patent Literature 1 describes a technology for causing an NPC (a ghost car) to drive on the basis of the record of player's previous operations. In addition, for example, in the case of a game in which a plurality of characters appear, games in which an NPC existing in a virtual space other than peripheral areas of player characters moves toward a certain target that serves as a target position have been released. The most common NPCs in these kinds of games are enemy characters, which are common in genres called action games or role-playing games, and these enemy characters are placed in a game in order to perform an attack against a player or to take an action to interfere with the player's action; that is, these enemy characters are placed so as to target a player character operated by the player. Beating or avoiding these enemy characters is one of the exciting aspects of the games. NPCs are controlled by using artificial intelligence (AI) technology for games, and in existing technologies, the movement of NPCs has been controlled by shortest path finding methods, which is one of the fields relating to the study of artificial intelligence.

CITATION LIST

Patent Literature

{PTL 1}
Japanese Unexamined Patent Application, Publication No. 2000-237453

SUMMARY OF INVENTION

Technical Problem

In the case where an NPC is moved by using a certain target as a target position, as described above, a search area including these characters is set, path finding to the target position is performed, and the NPC is moved according to the search result. Although in 3D games, a complex map in which players can move along various paths creates various strategies and thus is an important factor that increases the excitement of the games, there are the following problems regarding the execution of the path finding.

In conventional 3D games, a shortest path finding algorithm such as the A* (A star) algorithm or the JPS (Jump Point Search) algorithm is applied to a 3D map so as to select a movement path of an NPC. In this method, the path finding algorithm extracts the shortest path. Thus, when the map becomes more complex, the difference between a path of a character moved by a human, who does not always move along the shortest path, and the movement path of the NPC, which is controlled by a computer, becomes greater. Due to this kind of action gap between humans and NPCs, the behavior of the NPCs looks unnatural and monotonous to human players. In particular, players often feel a sense of unfairness when they see the process in which the NPCs move along short-distance paths without any difficulties even if the operations for moving along these paths are complex.

As a method for selecting a path that is similar to that of humans and that looks natural, there is a method in which fuzzy control or an agent model is applied as a weight in the shortest path finding algorithm. Although the fuzzy control or the agent model can produce behavior that looks similar to that of humans, it is difficult to apply them to a complex map because, when a 3D map becomes complex, control parameters need to be prepared according to the complexity.

One problem with the shortest path finding algorithm is related to the amount of calculations, and therefore, when weighting the shortest path finding algorithm, it is difficult to perform path finding while taking various factors other than distance into consideration, and it is extremely difficult to adjust the parameters in order to select a path that largely detours from the usual shortest path or a path that allows for easier movement operations. In particular, in the case of a map having a complex structure, there are many different factors that should be considered other than the distance on the path, such as the movement speed or ensuring a visual field. Thus, it is difficult to obtain a path that looks natural for humans by weighting the shortest path finding algorithm.

The present invention has been made in view of the situation described above, and the object thereof is to provide, on a complex map in a 3D game, a function for automatically performing weighting and determination of movement paths of NPCs such that players recognize as if the NPCs are being operated by humans, whereby the players can have a sense of realism and immersion. In addition, in order to realize realistic NPCs in a game in which the positions of characters on a 3D map strongly affect whether the player wins or loses, the present invention provides a function for automatically performing path finding according to the strengths or properties of characters in the game. In addition, in a typical game, it is expected that stronger and wiser enemies will appear over time according to the speed at which players become skilled at the game system. Thus, the present invention provides a learning function for performing path finding such that NPCs' actions change according to the changes of the players' actions.

Solution to Problem

The present invention has been made in view of the problems described above and has the following features. Specifically, a system according to an aspect of the present invention includes a server and one or more electronic devices connected to the server via a network, wherein characters operated by players of the electronic devices connected to the server are placed in a common game field and a game progresses, the game field being constituted of a plurality of navi blocks that individually define movable positions of the characters and including a plurality of log blocks constituted of the plurality of navi blocks, the server or the electronic devices including: a movement start determination part that, in order to move a non-player character that is not operated by the players, determines a movement start position and a movement target position of the non-player character; a global movement path determination part that determines, on the basis of history information of global movement paths represented by orders of positions of log blocks from the movement start position to the movement target position of a player character that is operated by one or more players, a global movement path from the determined movement start position to the determined movement target position, the global movement path having the highest frequency with which the global movement path is selected by the one or more players; a local movement path determination part that individually selects, from log blocks constituting the determined global movement path, positions of arbitrary navi blocks in log blocks that do not include the determined movement start position and movement target position as sub-destination positions, and determines a path from the determined movement start position or a sub-destination position to a sub-destination position in the next log block or to the determined movement target position on the determined global movement path; and a movement control part that moves the non-player character according to the determined path.

According to an aspect of the present invention, the local movement path determination part selects the sub-destination positions such that a path passing through only adjacent log blocks on the determined global movement path can be secured.

According to an aspect of the present invention, the history information is divided into groups according to at least one of the proceedings of the game and attributes of the players, and the global movement path determination part determines a global movement path having the highest frequency with which the global movement path is selected by one or more players on the basis of the history information of a group corresponding to the players.

According to an aspect of the present invention, the attributes of the players include at least one of a skill level, a total play time, a used character, attributes of the used character, a billing amount, nationality, and the number of players playing the game together of each player.

According to an aspect of the present invention, the server or the electronic devices further include a movement path learning part, and the movement path learning part determines a movement start position and a movement target position represented by positions of log blocks on the basis of a time period during which the player character is located at the same log block or the proceedings of the game, and stores global movement paths from the movement start position to the movement target position as the history information.

According to an aspect of the present invention, the history information is frequency information calculated for individual combinations of log blocks of the movement start position and log blocks of the movement end position.

A program according to an aspect of the present invention is a program for a game played by placing, in a common game field, characters operated by players of one or more electronic devices connected to a server via a network, the game field being constituted of a plurality of navi blocks that individually define movable positions of the characters and including a plurality of log blocks constituted of the plurality of navi blocks, the program causing the server to execute: a step of determining, in order to move a non-player character that is not operated by the players, a movement start position and a movement target position of the non-player character; a step of determining, on the basis of history information of global movement paths represented by orders of positions of log blocks from the movement start position to the movement target position of a player character that is operated by one or more players, a global movement path from the determined movement start position to the determined movement target position, the global movement path having the highest frequency with which the global movement path is selected by the one or more players; a step of individually selecting, from log blocks constituting the determined global movement path, positions of arbitrary navi blocks in log blocks that do not include the determined movement start position and movement target position as sub-destination positions, and determining a path from the determined movement start position or a sub-destination position to a sub-destination position in the next log block or to the determined movement target position on the determined global movement path; and a step of moving the non-player character according to the determined path.

According to an aspect of the present invention, the program further causes the server to execute a step of determining a movement start position and a movement target position represented by positions of log blocks on the basis of a time period during which the player character is located at the same log block or the proceedings of the game, and storing global movement paths from the movement start position to the movement target position as the history information.

A server according to an aspect of the present invention is a server in a game system including the server and one or more electronic devices connected to the server via a network, wherein characters operated by players of the electronic devices connected to the server are placed in a common game field and a game progresses, the game field being constituted of a plurality of navi blocks that individually define movable positions of the characters and including a plurality of log blocks constituted of the plurality of navi blocks, the server including: a movement start determination part that, in order to move a non-player character that is not operated by the players, determines a movement start position and a movement target position of the non-player character; a global movement path determination part that determines, on the basis of history information of global movement paths represented by orders of positions of log blocks from the movement start position to the movement target position of a player character that is operated by one or more players, a global movement path from the determined movement start position to the determined movement target position, the global movement path having the highest frequency with which the global movement path is selected by the one or more players; a local movement path determination part that individually selects, from log blocks constituting the determined global movement path, positions of arbitrary navi blocks in log blocks that do not include the determined movement start position and movement target position as sub-destination positions, and determines a path from the determined movement start position or a sub-destination position to a sub-destination position in the next log block or to the determined movement target position on the determined global movement path; and a movement control part that moves the non-player character according to the determined path.

An electronic device according to an aspect of the present invention is an electronic device in a game system including the server and one or more electronic devices connected to the server via a network, wherein characters operated by players of the electronic devices connected to the server are placed in a common game field and a game progresses, the game field being constituted of a plurality of navi blocks that individually define movable positions of the characters and including a plurality of log blocks constituted of the plurality of navi blocks, the electronic device including: a movement start determination part that, in order to move a non-player character that is not operated by the players, determines a movement start position and a movement target position of the non-player character; a global movement path determination part that determines, on the basis of history information of global movement paths represented by orders of positions of log blocks from the movement start position to the movement target position of a player character that is operated by one or more players, a global movement path from the determined movement start position to the determined movement target position, the global movement path having the highest frequency with which the global movement path is selected by the one or more players; a local movement path determination part that individually selects, from log blocks constituting the determined global movement path, positions of arbitrary navi blocks in log blocks that do not include the determined movement start position and movement target position as sub-destination positions, and determines a path from the determined movement start position or a sub-destination position to a sub-destination position in the next log block or to the determined movement target position on the determined global movement path; and a movement control part that moves the non-player character according to the determined path.

A game control method according to an aspect of the present invention is a game control method in a game system including a server and one or more electronic devices connected to the server via a network, wherein characters operated by players of the electronic devices connected to the server are placed in a common game field and a game is progressed, the game field being constituted of a plurality of navi blocks that individually define movable positions of the characters and including a plurality of log blocks constituted of the plurality of navi blocks, the game control method including: a step of determining, in order to move a non-player character that is not operated by the players, a movement start position and a movement target position of the non-player character; a step of determining, on the basis of history information of global movement paths represented by orders of positions of log blocks from the movement start position to the movement target position of a player character that is operated by one or more players, a global movement path from the determined movement start position to the determined movement target position, the global movement path having the highest frequency with which the global movement path is selected by the one or more players; a step of individually selecting, from log blocks constituting the determined global movement path, positions of arbitrary navi blocks in log blocks that do not include the determined movement start position and movement target position as sub-destination positions, and determining a path from the determined movement start position or a sub-destination position to a sub-destination position in the next log block or to the determined movement target position on the determined global movement path; and a step of moving the non-player character according to the determined path, the steps being executed by the server or the electronic devices.

Advantageous Effects of Invention

The present invention makes it possible, in searching for a path of an NPC from a movement start point to a destination, to realize path finding that is appropriate for a game and that looks natural for humans by globally adopting a human movement path calculated from human-movement-path frequency information, and locally applying a shortest path finding algorithm. This allows players to play the game while having a sense of realism and immersion.

In addition, the present invention classifies players into predetermined groups and automatically performs, by using movement-path frequency information of the individual classified players, path finding according to the strengths or properties of the characters in a game, thereby controlling NPCs. This makes it possible to make the behavior of the NPCs more natural than ever before and to make the NPCs automatically adopt movement strategies that are common to players in a game title administered for a long term.

In addition, the present invention makes it possible to realize NPCs that change their actions according to the speed at which a group of players becomes skilled at the game, by controlling the NPCs by automatically performing path finding according to the strengths or properties of the characters in a game. This is particularly effective in social games, in which it is important to adjust difficulty levels according to the speed at which the group of players becomes skilled at the game systems.

BRIEF DESCRIPTION OF DRAWINGS

FIG. 4 is a functional block diagram of a game system according to an embodiment of the present invention.

DESCRIPTION OF EMBODIMENTS

Figure 1:
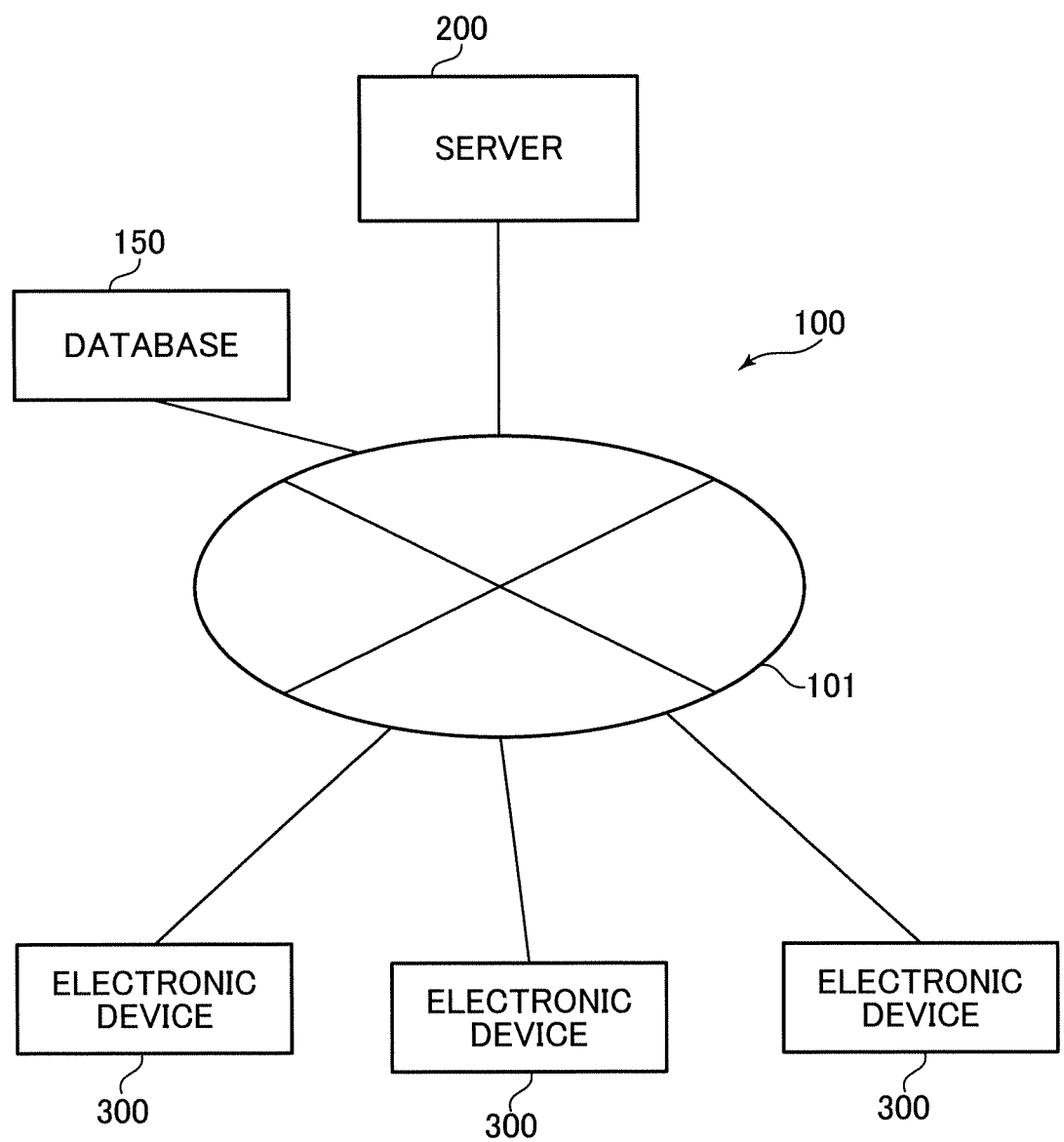
FIG. 1 shows the overall configuration of a system according to an embodiment of the present invention.

An embodiment of the present invention will be described below with reference to the drawings. In a game system according to this embodiment, one or more electronic devices are connected to each other via a network, etc., and a game in which one or more players can participate by sending and receiving information at individual electronic devices is provided.

Although a server/client system is assumed as the game system according to this embodiment, in which individual electronic devices are connected to each other via a network as described above, the game system can also be configured with a serverless system such as P-to-P. In addition, the number of electronic devices connected to the network may be one. Although the present invention can be realized by one electronic device without a connection to the network, in this specification, an embodiment realized by a system in which a plurality of electronic devices are connected to each other via a network will mainly be described.

Next, an overview of a game provided by a game system according to an embodiment of the present invention will be described. In this game, individual characters operated on individual electronic devices are placed on a game field or a game map, both of which are virtual spaces on the game, so as to allow individual players to play the game with these characters, and non-player characters (NPCs) not operated by the players are placed on the game field, and the actions thereof, including their movements, are controlled.

In this embodiment, the game field is a three-dimensional virtual space and is formed of a navigation mesh (hereinafter referred to as a "navi mesh"). The navi mesh (or game field) is constituted of a plurality of navi blocks and the navi blocks define movable positions (movable points) of a character on the game field. For example, individual navi blocks constituting the navi mesh are polygons, and each polygon is a polygon indicating a movable position (walkable area) of a character, which is different from a polygon for representing a background, objects, etc. In an embodiment, data related to the navi mesh is generated from map data. In addition, data for individual polygons constituting the navi mesh is stored in a navi mesh database. In an embodiment, the navi mesh database stores the surface parts of the geometry of a scene in a game as convex polygons.

In addition, since a technical feature of the present invention is to determine a path from a movement start position to a movement target position of an NPC in the case where the NPC needs to be moved, in this game, a character needs to be moved on the game field as the game progresses. For example, in this game, in the case where a player clears a stage and proceeds to the next stage or in the case where a certain event has occurred, characters, including NPCs, need to be moved in order to go to beat a target enemy or in order to obtain a target item. Here, an event refers to processing or control that occurs due to an operation by a player in the game or game-system-side processing and that has a single meaning and coherence. In addition, in the present invention, in the case where a path of an NPC from a movement start position to a movement target position is determined, it is assumed, unless otherwise noted, that the movement target position is out of the field of view (or a viewpoint camera) of the NPC located at the movement start position.

In addition, in the present invention, a log block constituted of a plurality of navi blocks is defined and used to perform frequency calculation of a movement path. The game field is also formed of a log mesh constituted of a plurality of log blocks. From the viewpoint of mesh structure, the log mesh is a loose mesh having a larger particle size than that of the navi mesh, and is preferably a mesh structure having the same outer borders as the navi mesh and covering the entire game field. In addition, areas (positions) corresponding to individual mesh areas of the navi mesh are navi blocks, and areas corresponding to individual mesh areas of the log mesh are log blocks. By defining the log blocks (log mesh) as described above, it is possible to grasp the frequency of a global movement path on the basis of the history of log block positions that the player character passed through. Information related to log blocks constituting a log mesh is stored in a log mesh database, and information related to the frequency of movement paths is stored in a path frequency information database. These features will be described below in detail. In this specification, unless otherwise noted, a position refers to a position in a navi block.

[System Configuration]

FIG. 1 shows an example of the overall configuration of a game system 100 according to an embodiment of the present invention. The system 100 includes a server 200 and a plurality of electronic devices 300. Although they are connected to each other via a network 101, they may be connected individually as needed. In addition, in the case where one of the plurality of electronic devices is made to function as a server, the system 100 may be configured not to include a server.

In addition, the system 100 can also include a database 150 separately from databases that may be provided on the server 200 or the electronic devices 300. In the case where the system 100 includes the database 150, the database 150 stores various kinds of databases, and the server 200 or the electronic devices 300 can obtain desired data by querying the database 150. Although it is assumed that the databases in the server 200 are mainly used below, the same applies to the case where the database 150 directly connected to the network is used.

[Overview of Server Configuration]

Figure 2:
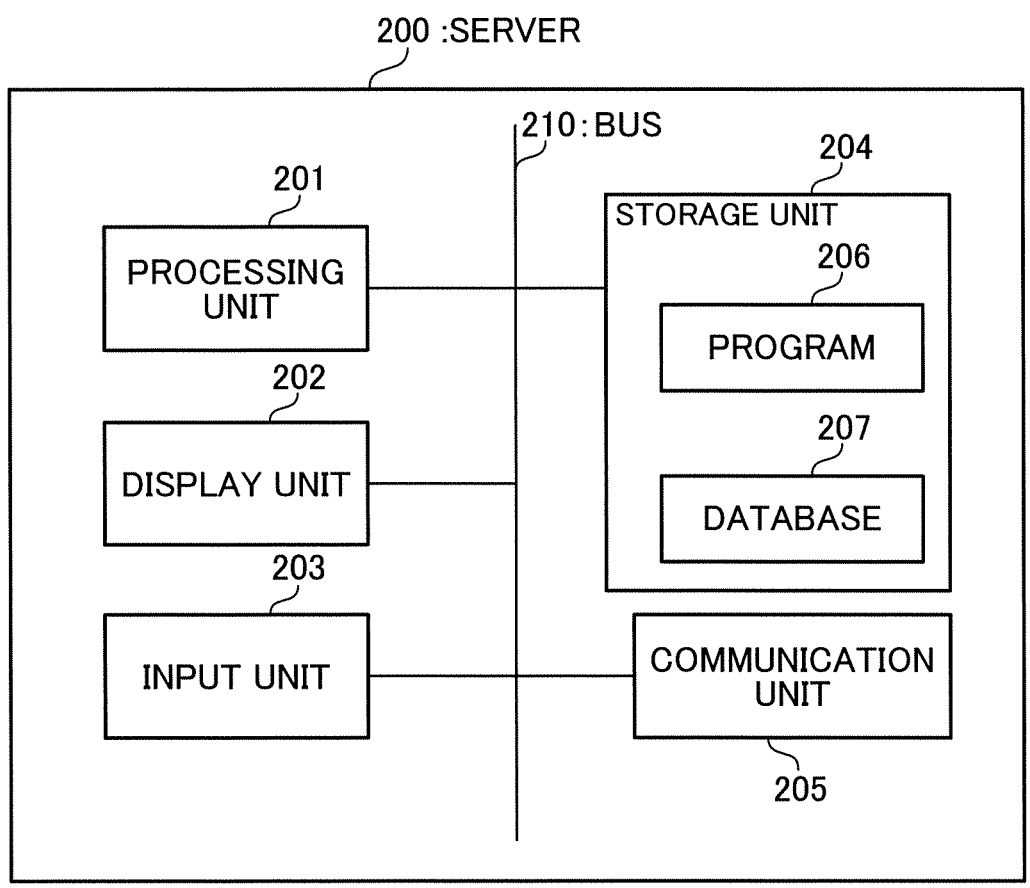
FIG. 2 shows the hardware configuration of a server according to an embodiment of the present invention.

FIG. 2 is a block diagram showing the hardware configuration of the server 200 according to an embodiment of the present invention. The server 200 includes a processing unit 201, a display unit 202, an input unit 203, a storage unit 204, and a communication unit 205. Although these components are connected to each other via a bus 210, the components may be connected individually as needed.

The processing unit 201 includes a processor that controls the components of the server 200, and the processing unit 201 executes various kinds of processing by using the storage unit 204 as a work area. The display unit 202 has a function for displaying information to a user. The input unit 203 has a function for accepting an input from the user, such as a keyboard or a mouse.

The storage unit 204 includes a hard disk, a main memory, and a buffer memory. A program 206 is stored in the hard disk. However, the hard disk may be any type of non-volatile storage or non-volatile memory that can store information and may also be removable. The storage unit 204 stores the program 206 and various kinds of data that can be referred to during execution of the program. In addition, the storage unit 204 can include a database 207. In this case, the database 207 includes a navi mesh database, a log mesh database, and a path frequency information database, which stores frequency information of movement paths.

The communication unit 205 carries out wired communication using an Ethernet (registered trademark) cable, etc. or wireless communication such as mobile communication, wireless LAN communication, etc. so as to connect to the network 101.

For example, the server 200 is an information processing apparatus used by a system administrator, etc. when administering and managing a game service and provided with the above-described hardware configuration. When the server 200 receives various kinds of commands (requests) from the electronic devices 300, the server 200 can deliver (respond with) a game program that can operate on the electronic devices 300 or a web page, a game screen, etc. created with a markup language conforming to the standards of the electronic devices 300.

Although the server 200 realizes various functions by executing the program 206, some of these functions can also be realized by configuring an electronic circuit, etc.

[Overview of the Configuration of an Electronic Device]

Figure 3:
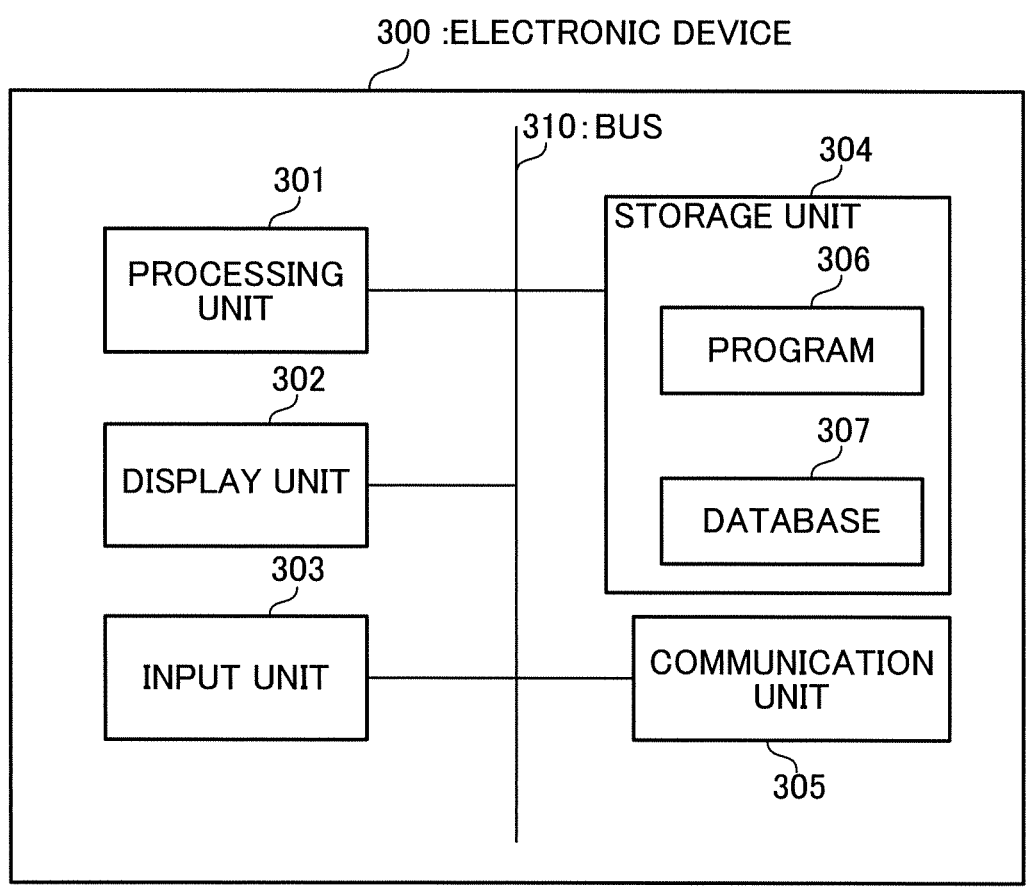
FIG. 3 shows the hardware configuration of an electronic device according to an embodiment of the present invention.

FIG. 3 is a block diagram showing the hardware configuration of the electronic device 300 according to an embodiment of the present invention. The electronic device 300 includes a processing unit 301, a display unit 302, an input unit 303, a storage unit 304, and a communication unit 305. Although these components are connected to each other via a bus 310, the components may be connected individually as needed.

The electronic device 300 is preferably a smartphone; however, it may be a computer equipped with a touch input device, such as a mobile phone, a mobile information terminal, a tablet computer, a video game machine, a portable video game machine, or a touchpad.

The processing unit 301 executes various kinds of processing, such as game processing or image generation processing, on the basis of programs, data input from the input unit 303, or data received from the server. The processing unit 301 includes a processor that controls the components of the electronic device 300, and it executes various kinds of processing by using the storage unit 304 as a work area.

The display unit (display) 302 displays a screen according to the proceedings of the game or an operation of a player under the control of the processing unit 301. Although the display unit 302 is preferably a liquid crystal display, it may be an organic EL display, a plasma display, etc.

The input unit 303 has a function for accepting an input from the user, such as a touchscreen, a touch pad, a keyboard, a mouse, or a game controller. For example, in the case of a touchscreen, an input based on a position touched by a player is supplied to the electronic device 300. In this case, the display unit 302 and the input unit 303 form an integrated structure in which an input by player touching the display unit 302 is accepted, and coordinates corresponding to the position touched by the player are detected and supplied to the electronic device 300 by the input unit 303. Although any detection method (e.g., a capacitive detection method for a touchscreen) may be used, preferably, the input unit 303 should detect touches simultaneously made by a player's fingers or the like at at least two points and supply coordinate information corresponding to the individual detected positions to the electronic device 300.

The storage unit 304 includes a hard disk, a main memory, and a buffer memory. A program 306 is stored in the hard disk. However, the hard disk may be any type of non-volatile storage or non-volatile memory that can store information and may also be removable. For example, in the case where the electronic device 300 is a smartphone, the storage unit 304 includes a ROM and a RAM. The storage unit 304 stores the program 306 and various kinds of data that can be referred to during the execution of the program. The program may include programs for all kinds of applications requiring user input, such as an operating system, a video game, or a web browser. The various kinds of data include, for example, image data for displaying various kinds of images such as an object appearing in a game, and data that can be written to the storage unit 304 during the game. The storage unit 304 can include a database 307 instead of the database 207 that the server 200 has. In this case, the database 307 includes a navi mesh database, a log mesh database, and a path frequency information database, which stores frequency information of movement paths.

The communication unit 305 carries out wired communication using an Ethernet (registered trademark) cable, etc. or wireless communication such as mobile communication, wireless LAN communication, etc. so as to connect to the network 101.

Although the electronic device 300 realizes these functions by executing the program 306, these functions can also be realized by configuring an electronic circuit, etc.

[Functional Block]

FIG. 4 shows an example of a functional block diagram for a game system according to the present invention. The system 100 includes an input accepting part 401, a screen display part 402, a movement control part 403, a movement path learning part 404, a movement path frequency determination part 405, a movement start determination part 406, a global movement path determination part 407, a local movement path determination part 408, a storage part 409, and a communication part 410. As described above, these functions are realized by causing the server 200 to execute the program 206, realized by causing the electronic device 300 to execute the program 306, or realized by causing the server 200 to execute the program 206 and causing the electronic device 300 to execute the program 306. That is, at least one of the server 200 and the electronic device 300 includes various kinds of functions shown in FIG. 4. In the case where the various functions are realized by loading programs, it is obvious that some of the functions of a certain part may be provided by another part.

The input accepting part 401 is a function that the electronic device 300 includes, and has a function for detecting an input by a player and supplying the input to the electronic device 300. For example, in the case where the electronic device 300 has a touchscreen, the input accepting part 401 detects a position on the input unit 303 touched by a player and supplies the position to the electronic device 300.

The screen display part 402 has a function for displaying image output data processed by the processing unit 301 on the display unit 302. The screen display part 402 can also directly display a web page, a game screen, etc. received from the server 200.

The movement control part 403 has a function for controlling the movement of a character, such as checking movable areas or controlling a movement speed, by referring to the navi mesh database. In addition, the movement control part 403 can move an NPC according to a path determined by the local movement path determination part 408, which will be described later.

The movement path learning part 404 has a function for learning a global movement path from a movement start position to a movement end position (movement target position) with respect to a continuous movement path of a player character. The movement start position and the movement end position to be learned are positions of individual log blocks at which they are positioned and the movement path to be learned is constituted of positions of log blocks that have been passed through. In addition, the movement path to be learned is a continuous movement path of a player character operated by one or more players. That is, the movement path learning part 404 stores a global movement path represented in order of the positions of log blocks that the player character passed through, including the positions of log blocks for the movement start position and the movement end position of the player character operated by the one or more players. The history information of the global movement path can be stored in a path history information database that can be included in the database 207 or 307. Alternatively, the history information can be passed directly to the movement path frequency determination part 405 without storing it in the path history information database.

In an embodiment, the movement path learning part 404 determines that a continuous movement path has started in the case where the need for going to beat a target enemy or the need for obtaining a target item arose when proceeding to the next scene or when a specific event has occurred as the game progresses, and determines, as a movement start position, the position of the log block at which a player character is positioned at that time, and when the player character reaches the target position, determines that the movement path has ended and determines, as a movement end position, the position of the log block at which the player character is positioned at that time. In another embodiment, in the case where a player character is positioned in the same log block for a predetermined time or longer, the movement path learning part 404 determines the position of the log block as a movement start position, and after that, in the case where the position of the player character moves to another log block and the player character is positioned in the log block after the movement for a predetermined time or longer, the movement path learning part 404 determines the position of the log block as a movement end position.

In yet another embodiment, the movement path learning part 404 can aggregate the stored history information by dividing it into groups according to at least one of the proceedings of the game and the attributes of a player operating a player character to be learned. The attributes of the player can include at least one of the skill level of the player, the total play time of the player, a character used by the player, attributes of the character used by the player (e.g., a weapon used by the character, the level of the character, character's compatibility with the game field, etc.), a billing amount for the player, the country to which the player belongs (e.g., the nationality of the player, the country of residence of the player, the country in which the game was downloaded, etc.), and the number of players playing the game together.

The movement path frequency determination part 405 has a function for calculating or determining the frequency of the global movement path, which is learned as described above, by using the history information of the global movement path, for individual combinations of the movement start positions (the positions of the log blocks) and the movement end positions (the positions of the log blocks). The frequency information of the global movement path is stored in the path frequency information database. Here, as described above, a global movement path is a movement path represented in order of the positions in the log blocks that a character passes through.

Thus, the path history information database or the path frequency information database is created by referring to the log mesh database. In addition, the movement path frequency determination part 405 can receive the history information of the learned global movement path as is, and can calculate and determine the movement path frequency. Although in this embodiment, it is preferable that the history information and the frequency information of the global movement path be stored individually in separate databases, since the frequency information is information created on the basis of the history information, it is possible to interpret the history information as a component containing the frequency information and having a broader concept. However, when the frequency information is created, it may be created considering the kind, properties, etc. of a game in which the present invention is implemented and incorporating some other pieces of information into the history information. Therefore, the frequency information is not necessarily information created only from the history information.

In the case where the movement path learning part 404 divides the history information of the global movement path into groups according to at least one of the proceedings of the game and the attributes of a player operating a player character, the movement path frequency determination part 405 can calculate or determine the frequency of the movement path by using the history information of the global movement path in a group corresponding to a player who actually plays the game at the electronic device 300.

The movement start determination part 406 has a function for determining the movement of an NPC and determining a movement start position and a movement target position. The determination of the movement of the NPC is performed in order to go to beat a target enemy or in order to obtain a target item in the case where a player proceeds to the next scene or a certain event has occurred as the game progresses. This determination makes it possible to move the NPC. Generally, the movement start position is a position at which the NPC exists at the time of the determination.

The global movement path determination part 407 determines a global movement path from the movement start position (the position of the log block) to the movement target position (the position of the log block) with respect to the movement start position and the movement target position determined as described above, on the basis of the degree of the movement path frequency determined as described above. Preferably, the global movement path determination part 407 determines a global movement path having the highest movement path frequency. As described above, the global movement path is a movement path represented by sequentially arranging the log blocks to be passed through from the movement start position to the movement target position. Since the global movement path is determined on the basis of the degree of the movement path frequency, the global movement path determination part 407 can include the movement path frequency determination part 405.

The local movement path determination part 408 selects, from log blocks constituting the global movement path determined by the global movement path determination part, the positions of arbitrary navi blocks in log blocks that do not include the movement start position and the movement target position as sub-destination positions. Then, according to the order of the log blocks in the determined global movement path, the local movement path determination part 408 (1) determines a path from the movement start position to a sub-destination position in the next log block on the global movement path, (2) determines a path from a sub-destination position to another sub-destination position in the next log block on the global movement path, or (3) determines a path from a sub-destination position to the movement target position in the next log block on the global movement path. After the local movement path determination part 408 determines one of the three paths (local movement paths) described above, the movement control part 403 moves the NPC according to the determined path. It is preferred that the three determined paths described above be the shortest paths determined by using a conventional shortest path finding algorithm. When the movement of the NPC ends, the path determination and the movement of the NPC are repeated until the NPC reaches a final target position. However, after the local movement path determination part 408 determines all three paths described above, the movement control part 403 may move the NPC according to the determined paths. In the case where the movement start position and the movement target position are located in adjacent log blocks, the sub-destinations do not exist. In this case, a path from the movement start position to the movement target position is to be searched for.

Figure 5A:
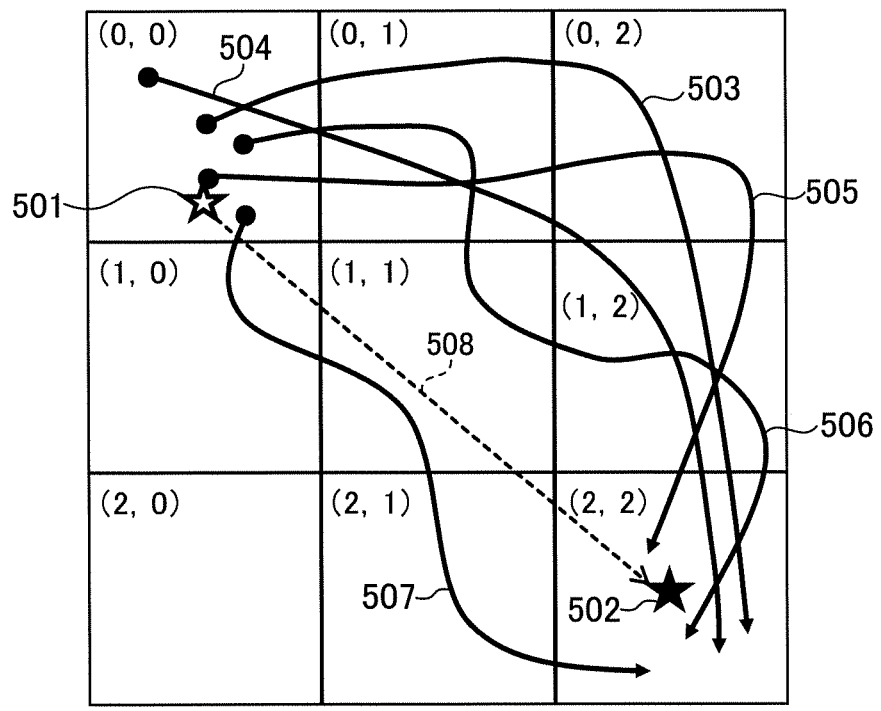
FIG. 5a shows how movement paths from a movement start position to a movement end position of a player character are learned by using a log mesh.
Figure 5B:
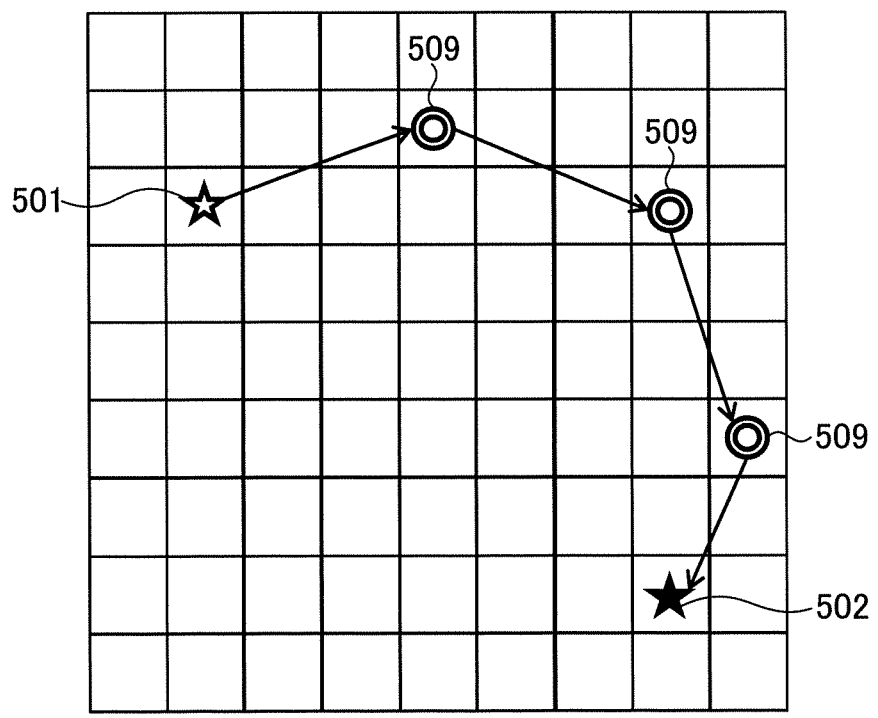
FIG. 5b shows how a path through which an NPC is to be moved is determined by using a navi mesh and on the basis of the learned paths.

Here, the learning and determination of the movement path will be described below in detail. FIG. 5a shows how a movement path is learned on the basis of log blocks, and FIG. 5b shows how the learned path is reproduced on navi blocks. As shown in FIG. 5a and FIG. 5b, the present invention uses a log mesh, which is a relatively loose 3D mesh, and a navi mesh, which is a relatively tight 3D mesh. Here, squares shown in FIG. 5a correspond to individual log blocks, and the log blocks individually have coordinate positions as shown in FIG. 5a. In addition, squares shown in FIG. 5b correspond to individual log blocks, and the log blocks individually have coordinate positions. Although these figures are shown two-dimensionally for ease of explanation, the 3D mesh is three-dimensional data and preferably includes information related to heights.

Specifically, FIG. 5a shows how movement paths from a movement start position to a movement end position are learned with respect to a continuous movement path of a player character. In FIG. 5a, the player character moves from an upper left position to a lower right position. Although this figure shows, for ease of explanation, how movement paths from a movement start position (0, 0) to a movement end position (2, 2) on log block positions are learned, any positions of log blocks can actually be the movement start position and the movement end position, and the movement path therebetween can be learned. Paths 503-507 indicates movement paths of a player character operated by a player (human) and a path 508 indicates the shortest path. As can be seen in FIG. 5a, many paths that take long detours are included in the movement history of the human. In the present invention, since log blocks are used to obtain the movement history of a player character, it is possible to accumulate the movement history as history for movements to the same location even if there are slight differences between the history items. Specifically, as shown in Table 1, it is possible to divide a movement path according to log blocks constituting a log mesh and accumulate frequencies in the movement history. Table 1 is an embodiment of the path frequency information database. Each pair of coordinates shown in Table 1 corresponds to the position of a log block. Here, Origin is a movement start position and Destination is a movement end position. Path_origin is a start position of a partial path of this movement path, and Path_dest is an end position of the partial path. In addition, Frequency is the frequency at which this partial path is passed through in the movement from Origin to Destination. In this way, it is possible to globally learn paths followed when moving from one point to another point. As described above, here, for ease of explanation, although only combinations of Origin (0, 0) and Destination (2, 2) are shown in Table 1, Table 1 can actually include all combinations of Origin and Destination that have been learned.

TABLE 1

| Origin | Destination | Path_origin | Path_dest | Frequency |
| --- | --- | --- | --- | --- |
| (0,0) | (2,2) | (0,0) | (0,1) | 4 |
| (0,0) | (2,2) | (0,0) | (1,0) | 1 |
| (0,0) | (2,2) | (0,1) | (0,2) | 3 |
| (0,0) | (2,2) | (0,1) | (1,1) | 1 |

TABLE 1-continued

| Origin | Destination | Path_origin | Path_dest | Frequency |
| --- | --- | --- | --- | --- |
| (0,0) | (2,2) | (0,2) | (1,2) | 3 |
| (0,0) | (2,2) | (1,0) | (1,1) | 1 |
| (0,0) | (2,2) | (1,1) | (2,1) | 1 |
| (0,0) | (2,2) | (1,2) | (2,2) | 4 |
| (0,0) | (2,2) | (2,1) | (2,2) | 1 |

FIG. 5b shows how a path through which an NPC moves is determined on the basis of the paths learned as explained with FIG. 5a in the case where the movement start determination part 406 determines the movement of the NPC and determines a movement start position 501 and a movement target position 502. Specifically, the path frequency information database is queried for the log block position (0,0) that is a movement start position (the current position of the NPC) and the log block position (2,2) that is a movement target position, and, among partial paths between these two points, a sequence having the highest frequency is extracted. In this case, in the movement path between Origin (0,0) and Destination (2,2), among partial paths from Path_origin (0,0), the path having the highest frequency is the partial path to Path_dest (0,1). In addition, among partial paths from Path_origin (0,1), the path having the highest frequency is the partial path to Path_dest (0,2). By repeating similar processing so as to extract partial paths between Path_origin (0,0) and Path_dest (0,1), between Path_origin (0,1) and Path_dest (0,2), between Path_origin (0,2) and Path_dest (1,2), and between Path_origin (1,2) and Path_dest (2,2), a global movement path {(0,0), (0,1), (0,2), (1,2), (2,2)} represented in the order of log block positions is determined. From this global movement path, sub-destinations 509 are generated as shown in FIG. 5b. The positions of the sub-destinations 509 are the positions of arbitrary navi blocks in log blocks that do not include the movement start position 501 and the movement target position 502 and selected after the global movement path is determined.

Then, according to the order of the log blocks in the determined global movement path, (1) a path from the movement start position 501 to a sub-destination position 509 in the next log block (0, 1) on the global movement path is determined, (2) a path from the sub-destination position 509 in the log block (0, 1) to a sub-destination position 509 in the next log block (0, 2) on the global movement path is determined and a path from the sub-destination position 509 in the log block (0, 2) to a sub-destination position 509 in the next log block (1, 2) on the global movement path is determined, and (3) a path from the sub-destination position 509 in the log block (1, 2) to the movement target position 502 in the next log block (2, 2) on the global movement path is determined. When searching for a movement path (local movement path) between sub-destination positions, it is preferable to use a conventional shortest path finding algorithm so as to determine the shortest path. The NPC is moved according to the determined local movement paths. Regarding the movement of the NPC, the NPC may be moved each time the local movement path is determined, and then the determination of the local movement path and the movement of the NPC may be repeated. Alternatively, the NPC may be moved after all the local movement paths are determined. Here, a movement path between sub-destination positions (from a start position of a partial path to an end position of the partial path) should not pass through log blocks other than log blocks in which these two target sub-destination positions are located. This is because, otherwise, the NPC will not pass through the determined global movement path. Therefore, it is preferable to select sub-destination positions such that a path passing through only adjacent log blocks on the determined global movement path can be secured. The same applies to the movement from a movement start position to a sub-destination position or the movement from a sub-destination position to a movement target position.

As described above, it is possible to realize natural path finding by using log blocks constituting a log mesh, which is a relatively loose 3D mesh, and navi blocks constituting a navi mesh, which is a relatively tight 3D mesh.

The storage part 409 has a function for storing a program, data, etc. in the storage unit 204 or 304. It is also possible to perform accumulation in various kinds of databases. The movement path learning part 404 can also be considered as part of the storage part 409.

The communication part 410 has a function for performing wireless communication and wired communication. The storage part 409 can obtain a program or data from a server, an optical disk, etc. via the communication part 410 and can store them.

[Information Processing]

A game provided by the game system in the present invention is realized by causing the server 200 to execute the program 206 and causing the electronic device 300 to execute the program 306. Regarding the processing or operations described below, unless there is no inconsistency related to the processing or operations, processing or operations executed by the server 200 by part of the program 206 can be realized by causing the electronic device 300 to execute the processing or operations by part of the program 306, and vice versa.

Figure 6:
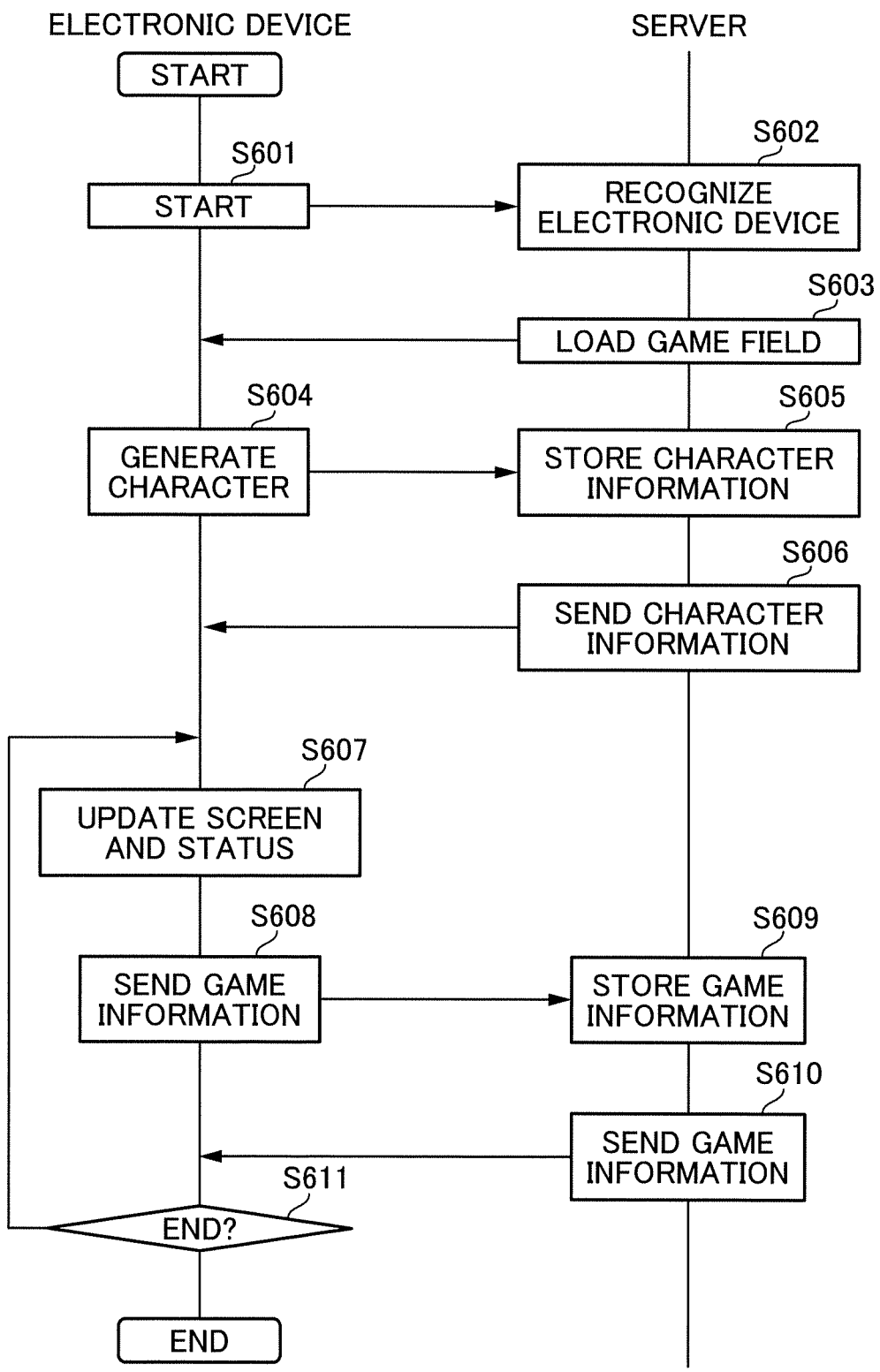
FIG. 6 is a flowchart showing information processing in a server and an electronic device in a game system according to an embodiment of the present invention.

FIG. 6 is a flowchart showing information processing in the server 200 and the electronic device 300 in the system 100 according to an embodiment. The electronic device 300 starts a game by executing the program 306 (step 601) and starts communication with the server 200. For example, in the case where a smartphone is used as the electronic device 300, the program 306 can include a game application, and a player can start the game by launching the application. This causes the server 200 to recognize the electronic device 300 (step 602). Then, the server 200 loads a game field from, for example, the program 206 and sends information related to the game field to the electronic device 300 (step 603). However, the game field may be loaded or generated by executing the program 306.

Next, the electronic device 300 generates a player character (step 604). The player character is generated by the player's selection or is automatically generated by the program. The electronic device 300 sends information related to the generated player character to the server 200 (step 604). The server 200 stores the character information and also stores character information sent from other players (step 605). However, in the case where the server 200 has already stored character information sent from other players or in the case where other players do not exist, the server 200 does not store character information sent from other players in step 605.

Here, character information indicates various kinds of statuses of a character in a game and can include an operation of the character at that time or position information of the character in the game field. The electronic device 300 and the server 200 transmit game information including this kind of character information or the like between each other. However, data structures related to game information are not limited to these structures.

The server 200 sends part or all of the stored character information and the character information of the NPC loaded from the program 206, etc. to individual electronic devices 300 (step 606).

Next, the electronic device 300 receives the character information from the server 200 and updates a screen or various kinds of statuses of individual characters (step 607). The received information does not necessarily need to be all of the information required for the game but may be only information required for the player to operate the game.

As the game progresses, when the player character is operated or an event occurs on the game field, the character information including the position information is updated. The electronic device 300 sends, to the server 200, game information including the player character information, a sending request to the server, etc. at predetermined intervals (step 608). The electronic device 300 may send the game information to the server 200 regularly, as described above, or may send the game information to the server 200 in response to a request from the server 200. The server 200 stores the game information received from the individual electronic devices 300 (step 609) and sends the game information including part or all of the stored character information and the character information loaded from the program 206, etc. (step 610), and the electronic devices 300 receive the information. Similarly, the server 200 may send, to the individual electronic devices 300, the game information including information related to individual characters at predetermined intervals or may send the game information in response to requests from the electronic devices 300. Hereafter, steps 607 to 611 are repeated as long as the electronic devices 300 continue to execute the game (step 611).

In the case where the present invention is realized by a single electronic device that is not connected to the network, the present invention is realized by causing the electronic device 300 to execute the program 306, and the electronic device 300 includes all of the functions shown in FIG. 4. In this case, communication as shown in FIG. 6 is not performed. However, in the case where the server 200 includes some of the functions shown in FIG. 4, the electronic device 300 needs to connect to the server 200, and thus, the electronic device 300 performs communication including part or all of information processing steps in the flowchart shown in FIG. 6.

Figure 7:
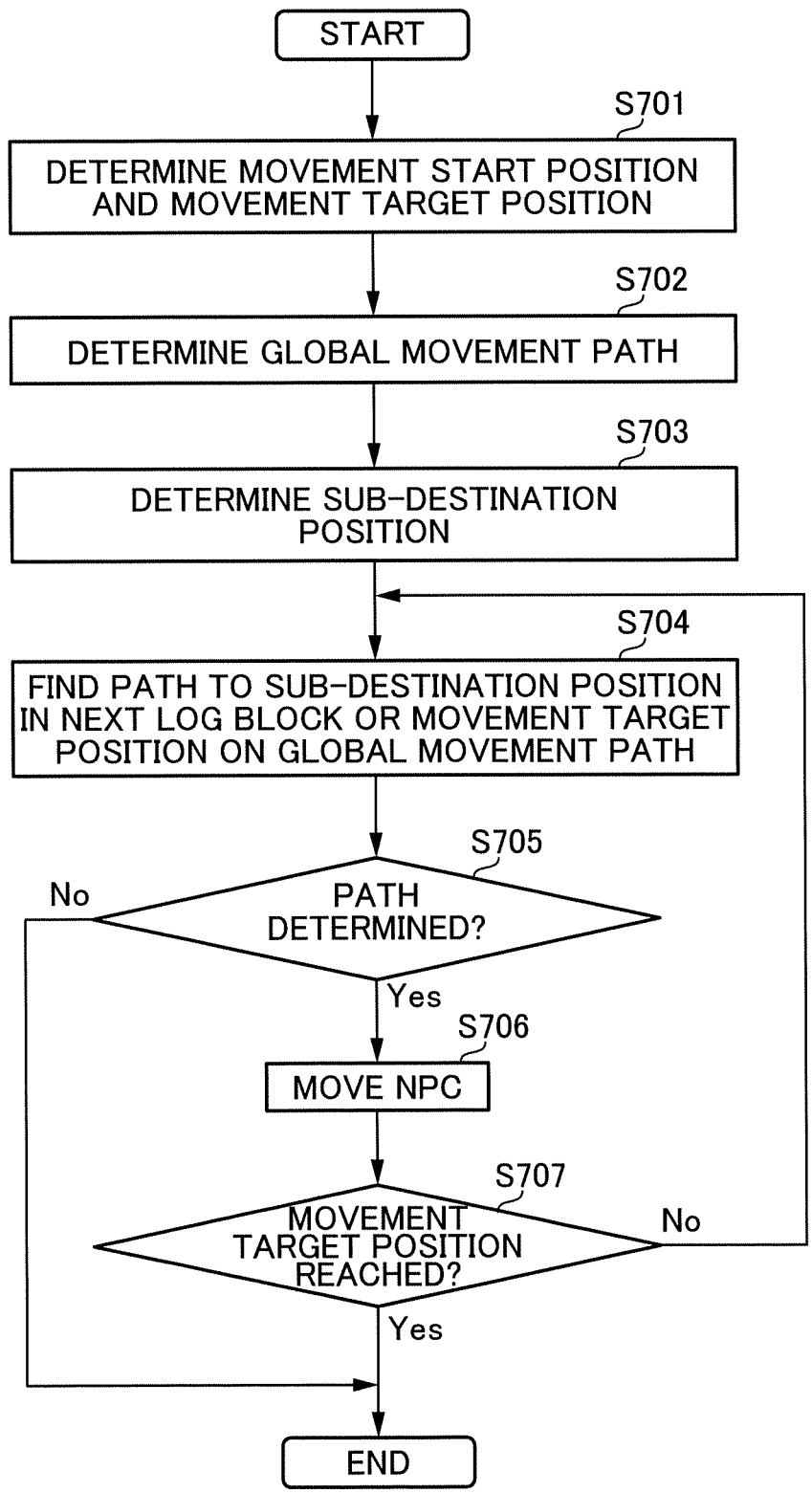
FIG. 7 is a flowchart showing information processing of movement path finding in a game system according to an embodiment of the present invention.

FIG. 7 is a flowchart showing information processing of movement path finding in a game system according to an embodiment of the present invention. In this flowchart, it is assumed that the server 200 includes the movement control part 403, the movement path learning part 404, the movement path frequency determination part 405, the movement start determination part 406, the global movement path determination part 407, and the local movement path determination part 408. The processing in the flowchart, which will be described below, is executed at the same time as steps 607 to 611 in FIG. 6 are executed. However, it is possible to configure the processing to be executed in information processing in a single flowchart by modifying it so as to be integrated into steps 607 to 611.

First, the flow is started by the movement start determination part 406 determining the movement of an NPC, and the movement start determination part 406 determines a movement start position (generally, the current position of the NPC) and a movement target position (step 701). The movement start determination part 406 determines the movement of the NPC and determines the movement start position and the movement target position in order to go to beat a target enemy or in order to obtain a target item in the case where a player proceeds to the next scene or a certain event has occurred as the game progresses. Preferably, these positions are determined as the positions in navi blocks by referring to the navi mesh database, as appropriate.

Next, with respect to the determined movement start position and movement target position, the global movement path determination part 407 determines a global movement path from the movement start position to the movement target position on the basis of the degree of movement path frequency determined by the movement path frequency determination part 405 (step 702).

Next, the local movement path determination part 408 determines, from log blocks constituting the global movement path determined by the global movement path determination part, the positions of arbitrary navi blocks in log blocks that do not include the movement start position and the movement target position as sub-destination positions (step 703). However, in the case where the movement start position and the movement target position are located in adjacent log blocks, the sub-destinations do not exist, and thus, the determination is not performed. After determining the sub-destination positions, a path from the movement start position to a sub-destination position in the next log block on the movement path is searched for (step 704). As described above, the path finding here should preferably be shortest path finding. In the case where the sub-destinations do not exist, a path from the movement start position to the movement target position is to be searched for.

Next, the local movement path determination part 408 determines whether the path could be determined as a result of the finding (step 705). The case where the path cannot be determined refers to the case where a path passing through the two target positions of the path finding was not found, or the case where the path was found but the found path passes through log blocks other than the log blocks at which these two individual positions are located. In the case where the path could be determined, the processing proceeds to step 406, but in the case where the path could not be determined, the NPC cannot be moved, and the information processing flow shown in FIG. 7 is terminated or the processing returns to step 702 or 703 (not shown). It is possible to configure the processing such that, in the case where the path could not be determined, this is reported to an administrator.

When the path is determined, the movement control part 403 moves the NPC according to the determined path (step 706). When the movement of the NPC ends, it is determined whether or not the movement target position is reached (step 707). In the case where the movement target position is reached, the information processing flow shown in FIG. 7 is terminated. In the case where the movement target position is not reached, the processing returns to step 704, a path from a sub-destination position at which the NPC is currently located to a sub-destination position in the next log block on the movement path or to the movement target position is searched for, then the processing proceeds to step 705, and these processing steps are repeated until the NPC reaches the movement target position.

The information processing flow shown in FIG. 7 is executed by invoking step 701 from the main loop of the game program as a trigger, or is executed as part of the main loop of the game program. The main loop of the game program includes various kinds of interrupt processing, and when a predetermined kind of interrupt processing is executed, the information processing shown in FIG. 7 is terminated. For example, the predetermined kind of interrupt processing is executed in the case where the NPC encounters a player character that is an enemy or in the case where a game scene status is changed such as when a game stage is terminated before reaching the final target position.

[System Architecture]

Figure 8:
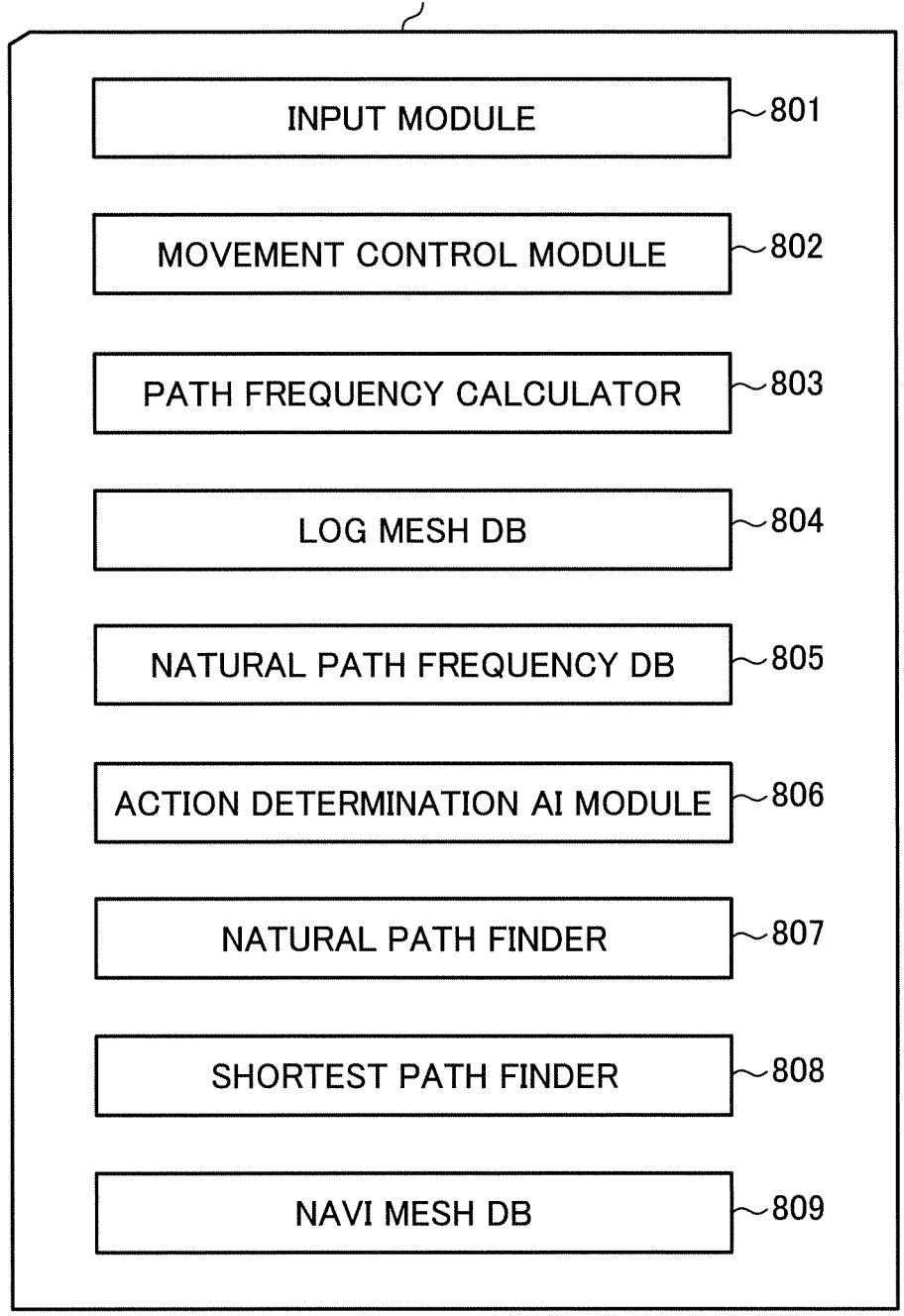
FIG. 8 shows the system architecture of a game system according to an embodiment of the present invention.

As described above, the system according to this embodiment can be realized with a single electronic device or with a system in which a plurality of electronic devices are connected to each other via a network. Although the system has the functions shown in FIG. 4, a system architecture 800 according to an embodiment can be constituted of nine modules shown in FIG. 8. This kind of modularization makes it possible to change some of the modules and apply the modules to various kinds of games.

An input module 801 is a module that accepts an input from a human through a user interface of a terminal at which a game is being executed. This module corresponds to an input event handler that existing game systems have, and has a function corresponding to the input accepting part 401.

A movement control module 802 is a module that controls the movement of a player character, such as checking movable areas or controlling a movement speed, and that has a function corresponding to the movement control part 403. Since navi block information stored in a navi mesh DB is required for controlling the movement of the player character, the movement control module 802 refers to the navi mesh DB, as appropriate.

A path frequency calculator 803 is a module that accumulates, for a continuous movement path of a player character, the frequencies of individual log blocks constituting a log mesh, and has a function corresponding to the movement path frequency determination part 405.

A log mesh DB 804 is a database that is used for performing frequency calculation of a movement path and that stores data related to a log mesh, which has a larger particle size than a navi mesh.

A natural path frequency DB 805 is a database that stores movement path frequency information having a data structure as shown in Table 1 and that has a function corresponding to the path frequency information database.

An action determination AI module 806 is a software module that determines the action of an NPC and that has a function corresponding to the movement start determination part 406. When this module determines the movement of the NPC, Origin (movement start position) and Destination (movement target position) are input as parameters for a natural path finder 807.

The natural path finder 807 is a module that extracts, from the natural path frequency DB 805, paths having high frequencies as a sequence of partial paths and performs a global path finding by using the movement path history of a human, and that has a function corresponding to the global movement path determination part 407.

A shortest path finder 808 is a module that searches for, as the shortest paths, movement paths on the basis of partial paths output by the natural path finder 807 by using navi blocks constituting a navi mesh, and that has a function corresponding to the local movement path determination part 408. This module repeats the path finding and moves the NPC until one of the following conditions is satisfied: (i) the movement target position has been reached, and (ii) an interruption has occurred, such as the player encountering an enemy.

A navi mesh DB 809 is a database that stores data related to the navi mesh.

In the processing or operations described above, in a certain step, unless there is no inconsistency related to the processing or operations, such as using data that should not be available yet in that step, the processing or operations can be changed freely. In addition, the embodiments described above are examples for explaining the present invention, and the present invention is not limited to these embodiments. The present invention can be embodied in various kinds of forms without departing from the spirit thereof.

REFERENCE SIGNS LIST

100 System
101 Network
150 Database
200 Server
201, 301 Processing units
202, 302 Display units
203, 303 Input units
204, 304 Storage units
205, 305 Communication units
206, 306 Programs
207, 307 Databases
210, 310 Buses
300 Electronic device
401 Input accepting part
402 Screen display part
403 Movement control part
404 Movement path learning part
405 Movement path frequency determination part
406 Movement start determination part
407 Global movement path determination part
408 Local movement path determination part
409 Storage part
410 Communication part
501 Movement start position
502 Movement end position (movement target position)
503, 504, 505, 506, 507 Paths
508 Shortest path
509 Sub-destination
800 System architecture
801 Input module
802 Movement control module
803 Path frequency calculator
804 Log mesh DB
805 Natural path frequency DB
806 Action determination AI module
807 Natural path finder
808 Shortest path finder
809 Navi mesh DB

The invention claimed is:

1. A game system comprising:
a server; and
an electronic device comprising a display and connected to the server via a network,
wherein a plurality of player characters operated by a plurality of players using a plurality of additional electronic devices connected to the server are placed in a common game field on the display and within a three-dimensional virtual space,
wherein a game progresses within the three-dimensional virtual space,
wherein the common game field comprises a navigation mesh of polygons including a plurality of navi blocks that individually define movable positions of the plurality of player characters within the three-dimensional virtual space,
wherein the common game field comprises a plurality of log blocks wherein a log block among the plurality of log blocks comprises at least two navi blocks,
wherein the server or the electronic device comprises:
a movement start determination part that determines a movement start position and a movement target position of a non-player character in the game;
a global movement path determination part that determines a global movement path based on history information of a plurality of global movement paths within the three-dimensional virtual space,
wherein the history information of the plurality of global movement paths is represented by orders of positions of log blocks from a plurality of movement start positions to a plurality of movement target positions of the plurality of player characters,
wherein the global movement path is determined from the history information based on a frequency that the plurality of players select the plurality of global movement paths within the three-dimensional virtual space;
a local movement path determination part that individually selects a plurality of positions of arbitrary navi blocks within a portion of log blocks among the plurality of log blocks from the global movement path, and determines a local movement path from the movement start position to the movement target position of the non-player character based on the global movement path; and
a movement control part that moves the non-player character within the three-dimensional virtual space according to the local movement path.

2. The game system according to claim 1, wherein the local movement path determination part selects sub-destination positions such that the local movement path passing through only adjacent log blocks on the determined global movement path can be secured.

3. The game system according to claim 1, wherein the history information is divided into groups according to at least one of:
proceedings of the game and attributes of the plurality of players; and
wherein the global movement path determination part determines the global movement path having a highest frequency with which the global movement path is selected by the plurality of players based on the history information of the plurality of global movement paths.

4. The game system according to claim 3, wherein the attributes of the players include at least one of: a skill level; a total play time; a used character; attributes of the used character; a billing amount; nationality; and a number of players playing the game together.

5. The game system according to claim 1, wherein at least one of the server and the electronic device further comprises a movement path learning part, wherein the movement path learning part determines a movement start position and a movement target position represented by positions of log blocks based on a time period during which the plurality of player characters are located at a same log block or proceedings of the game, and stores the plurality of global movement paths from the movement start position to the movement target position as the history information.

6. The game system according to claim 1, wherein the history information comprises frequency information calculated for individual combinations of log blocks of the movement start position and log blocks of the movement target position.

7. A non-transitory computer readable medium storing a program for a game played by placing, in a common game field on a display and within a three-dimensional virtual space, a plurality of player characters operated by a plurality of players using a plurality of electronic devices connected to a server via a network, the common game field comprising a navigation mesh of polygons including a plurality of navi blocks that individually define movable positions of the plurality of player characters within the three-dimensional virtual space and comprising a plurality of log blocks wherein a log block among the plurality of log blocks comprises at least two navi blocks, wherein the program causes the server to execute:
  a step of determining a movement start position and a movement target position of a non-player character in the game;
  a step of determining a global movement path based on history information of a plurality of global movement paths within the three-dimensional virtual space,
    wherein the history information of the plurality of global movement paths is represented by orders of positions of log blocks from a plurality of movement start positions to a plurality of movement target positions of the plurality of player characters, and
    wherein the global movement path is determined from the history information based on a frequency that the plurality of players select the plurality of global movement paths within the three-dimensional virtual space;
  a step of individually selecting a plurality of positions of arbitrary navi blocks within a portion of log blocks among the plurality of log blocks from the global movement path, and determining a local movement path from the movement start position to the movement target position of the non-player character based on the global movement path; and
  a step of moving the non-player character within the three-dimensional virtual space according to the local movement path.

8. The non-transitory computer readable medium according to claim 7, wherein the program further causes the server to execute a step of determining the movement start position and the movement target position represented by positions of log blocks based on a time period during which the plurality of player characters are located at a same log block or proceedings of the game, and storing the plurality of global movement paths from the movement start position to the movement target position as the history information.

9. A server in a game system including a plurality of electronic devices each having a display and connected to the server via a network,
  wherein a plurality of player characters operated by a plurality of players using the plurality of electronic devices are placed in a common game field on the display and within a three-dimensional virtual space,
  wherein a game progresses within the three-dimensional virtual space,
  wherein the common game field comprises a navigation mesh of polygons including a plurality of navi blocks that individually define movable positions of the plurality of player characters within the three-dimensional virtual space, and
  wherein the common game field comprises a plurality of log blocks wherein a log block among the plurality of log blocks comprises at least two navi blocks,
  the server comprising:
    a movement start determination part that determines a movement start position and a movement target position of a non-player character in the game;
    a global movement path determination part that determines a global movement path based on history information of a plurality of global movement paths within the three-dimensional virtual space,
      wherein the history information of the plurality of global movement paths is represented by orders of positions of log blocks from a plurality of movement start positions to a plurality of movement target positions of the plurality of player characters,
      wherein the global movement path is determined from the history information based on a frequency that the plurality of players select the plurality of global movement paths within the three-dimensional virtual space;
    a local movement path determination part that individually selects a plurality of positions of arbitrary navi blocks within a portion of log blocks among the plurality of log blocks from the global movement path, and determines a local movement path from the movement start position to the movement target position of the non-player character based on the global movement path; and
    a movement control part that moves the non-player character within the three-dimensional virtual space according to the local movement path.

10. An electronic device in a game system including a server connected to the electronic device via a network, the electronic device comprising a display,
  wherein a plurality of player characters operated by a plurality of players using a plurality of additional electronic devices connected to the server are placed in a common game field on the display and within a three-dimensional virtual space,
  wherein a game progresses within the three-dimensional virtual space,
  wherein the common game field comprises a navigation mesh of polygons including a plurality of navi blocks that individually define movable positions of the plurality of player characters within the three-dimensional virtual space, and
  wherein the common game field comprises a plurality of log blocks wherein a log block among the plurality of log blocks comprises at least two navi blocks,
  the electronic device further comprising:
    a movement start determination part that determines a movement start position and a movement target position of a non-player character in the game;
    a global movement path determination part that determines a global movement path based on history information of a plurality of global movement paths within the three-dimensional virtual space,
      wherein the history information of the plurality of global movement paths is represented by orders of positions of log blocks from a plurality of movement start positions to a plurality of movement target positions of the plurality of player characters,
      wherein the global movement path is determined from the history information based on a frequency that the plurality of players select the plurality of global movement paths within the three-dimensional virtual space;
    a local movement path determination part that individually selects a plurality of positions of arbitrary navi blocks within a portion of log blocks among the plurality of log blocks from the global movement path, and determines a local movement path from the movement start position to the movement target position of the non-player character based on the global movement path; and a movement control part that moves the non-player character within the three-dimensional virtual space according to the local movement path.

11. A game control method in a game system including a server and an electronic device comprising a display and connected to the server via a network, wherein a plurality of player characters operated by a plurality of players using a plurality of additional electronic devices connected to the server are placed in a common game field on the display and within a three-dimensional virtual space, wherein a game progresses within the three-dimensional virtual space, wherein the common game field comprises a navigation mesh of polygons including a plurality of navi blocks that individually define movable positions of the plurality of player characters within the three-dimensional virtual space, and wherein the common game field comprises a plurality of log blocks wherein a log block among the plurality of log blocks comprises at least two navi blocks, the game control method comprising:

a step of determining a movement start position and a movement target position of a non-player character in the game;

a step of determining a global movement path based on history information of a plurality of global movement paths within the three-dimensional virtual space, wherein the history information of the plurality of global movement paths is represented by orders of positions of log blocks from a plurality of movement start positions to a plurality of movement target positions of the plurality of player characters, wherein the global movement path is determined from the history information based on a frequency that the plurality of players select the plurality of global movement paths within the three-dimensional virtual space;

a step of individually selecting a plurality of positions of arbitrary navi blocks within a portion of log blocks among a plurality of log blocks from the global movement path, and determining a local movement path from the movement start position to the movement target position of the non-player character based on the global movement path; and a step of moving the non-player character within the three-dimensional virtual space according to the local movement path.

* * * * *